(12) United States Patent
Carro

(10) Patent No.: US 8,041,753 B2
(45) Date of Patent: Oct. 18, 2011

(54) METHOD AND SYSTEMS FOR HYPERLINKING FILES

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 11/865,147

(22) Filed: Oct. 1, 2007

(65) Prior Publication Data

US 2008/0034280 A1 Feb. 7, 2008

Related U.S. Application Data

(63) Continuation of application No. 10/533,597, filed on May 2, 2005, now Pat. No. 7,330,863.

(51) Int. Cl.
*G06F 12/00* (2006.01)
*G06F 17/30* (2006.01)

(52) U.S. Cl. .......... 707/822; 707/828; 715/205

(58) Field of Classification Search .......... None
See application file for complete search history.

(56) References Cited

U.S. PATENT DOCUMENTS

| | | | |
|---|---|---|---|
| 4,881,075 A | | 11/1989 | Weng |
| 5,794,230 A | * | 8/1998 | Horadan et al. ........... 705/35 |
| 5,971,277 A | | 10/1999 | Cragun et al. |
| 5,978,791 A | | 11/1999 | Farber et al. |
| 5,991,760 A | | 11/1999 | Gauvin et al. |
| 6,047,312 A | | 4/2000 | Brooks et al. |
| 6,167,567 A | | 12/2000 | Chiles et al. |
| 6,192,375 B1 | * | 2/2001 | Gross ........... 1/1 |
| 6,199,153 B1 | | 3/2001 | Razdan et al. |
| 6,353,823 B1 | | 3/2002 | Kumar |
| 6,360,252 B1 | | 3/2002 | Rudy et al. |
| 6,367,012 B1 | | 4/2002 | Atkinson et al. |
| 6,381,742 B2 | | 4/2002 | Forbes et al. |

(Continued)

FOREIGN PATENT DOCUMENTS

CA 2327198 5/2002

(Continued)

OTHER PUBLICATIONS

Glassman, Steven; A caching relay for the World Wide Web; Computer Networks and ISDN Systems, vol. 27, No. 2, (1994), pp. 165-173.

(Continued)

*Primary Examiner* — Alicia M Lewis
(74) *Attorney, Agent, or Firm* — Schmeiser, Olsen & Watts; John Pivnichny

(57) ABSTRACT

A method and apparatus for hyperlinking a main file with N target files stored in a computer readable medium ($N \geq 1$). A primary filename of the main file, which is hyperlinked with N target file addresses to form a composite filename, has a form of F.E. The composite filename has a form of F(A).E, wherein F and E respectively represent a name component and an extension component of the primary filename. The N target files are denoted as $T_1, T_2, \ldots, T_N$ having the associated N target file addresses respectively denoted as $A_1, A_2, \ldots, A_N$, wherein A represents $A_1, A_2, \ldots, A_N$. The symbol ( between F and A denotes a first control character that separates F and A. The symbol ) between A and E denotes a second control character that separates A and E. The composite filename is stored in the computer readable medium.

21 Claims, 2 Drawing Sheets encoded hyperlinked filename

U.S. PATENT DOCUMENTS

| | | | |
|---|---|---|---|
| 6,393,468 | B1 | 5/2002 | McGee |
| 6,453,340 | B1 | 9/2002 | Emura |
| 6,512,840 | B1 | 1/2003 | Tognazzini |
| 7,114,070 | B1 | 9/2006 | Willming et al. |
| 7,330,863 | B2 | 2/2008 | Carro |
| 7,395,426 | B2 | 7/2008 | Lee et al. |
| 7,401,105 | B2 | 7/2008 | Carro |
| 7,617,124 | B1 * | 11/2009 | Ronning et al. ............... 705/26 |
| 7,644,280 | B2 | 1/2010 | Carro |
| 7,752,240 | B2 | 7/2010 | Carro |
| 2001/0020272 | A1 | 9/2001 | Le Pennec et al. |
| 2001/0039587 | A1 | 11/2001 | Uhler et al. |
| 2002/0052885 | A1 | 5/2002 | Levy |
| 2002/0129256 | A1 | 9/2002 | Parmelee et al. |
| 2003/0023973 | A1 * | 1/2003 | Monson et al. ............... 725/34 |
| 2003/0033286 | A1 | 2/2003 | Burgess |
| 2003/0045273 | A1 | 3/2003 | Pyhalammi et al. |
| 2003/0074555 | A1 | 4/2003 | Fahn et al. |
| 2003/0079052 | A1 | 4/2003 | Kushnirskiy |
| 2003/0084096 | A1 | 5/2003 | Starbuck et al. |
| 2003/0088783 | A1 | 5/2003 | DiPierro |
| 2003/0119386 | A1 | 6/2003 | Laux et al. |
| 2003/0126592 | A1 | 7/2003 | Mishra et al. |
| 2003/0189642 | A1 | 10/2003 | Bean et al. |
| 2003/0200193 | A1 | 10/2003 | Boucher |
| 2003/0204843 | A1 | 10/2003 | Barmettler et al. |
| 2003/0208530 | A1 * | 11/2003 | Bhogal et al. ............... 709/203 |
| 2004/0088360 | A1 | 5/2004 | Caughey |
| 2004/0092251 | A1 | 5/2004 | Fell et al. |
| 2005/0004909 | A1 | 1/2005 | Stevenson et al. |
| 2005/0005097 | A1 | 1/2005 | Murakawa |
| 2005/0097114 | A1 | 5/2005 | Carro |
| 2005/0188203 | A1 | 8/2005 | Bhaskaran et al. |
| 2005/0289149 | A1 | 12/2005 | Carro |
| 2006/0059212 | A1 | 3/2006 | Carro |
| 2006/0259516 | A1 * | 11/2006 | Stakutis et al. ............... 707/200 |
| 2007/0168657 | A1 | 7/2007 | Carro |
| 2008/0235669 | A1 | 9/2008 | Carro |
| 2009/0043784 | A1 | 2/2009 | Carro |

FOREIGN PATENT DOCUMENTS

| | | |
|---|---|---|
| EP | 0813132 | 12/1997 |
| JP | PUPA2001345979 | 12/2001 |
| WO | WO 99/05617 | 2/1999 |

OTHER PUBLICATIONS

Ashman, H.; "Theory and Practice of Large-Scale Hypermedia Management Systems" Internet Article. PhD. Thesis. Royal Melbourne Institute of Technology, "Online! 1997, XP002285663 Australia; *Chapter 2: A survey of externalised and computed hypermedia links (pp. 26-70)*.

Vanzyl et al.; "Open Hypertext Systems; An Examination of Requirements, and Analysis of Implementation Strategies, comparing Microcosm, HyperTED and World Wide Web" Internet Article, 'Online! 1994, pp. 1-13.

Baker et al.; "The Gecko NFS Web proxy"; Department of Computer Science, University of Arizona, Tucson, AZ, 1999; Published by Elsevier Science BV; pp. 647-658.

Suel et al.; "Compress the Graph Structure of the Web"; Data Compression Conf. Proc; Data Compression Conference Proceedings 2001; pp. 1-10.

Various; "Feedback on "Tips on Handling Internet Downloads""The Naked PC, Online! May 27, 2001; XPOO2285666 Retrieved from the Internet: URL:http://web.archive.org/web/20010527043912/http://www.thenakedpc.com/dan/manage_d loads/> 'retrieved on Jun. 21, 2004.

Bender et al.; Techniques for data hiding; IBM Systems Journal, vol. 35, Nos. 3&4, 1996; pp. 313-336.

UIUC DLI Testbed Processing Customization, http://dli.grainger.uiuc.edu/papers/coletext.htm Mar. 12, 1996. 7 pages.

Can I support long file names on my Mac?, http://www.zdnet.co.uk/help/tips/story/0,2802,e7107647,00.html. 3 pages, Mar. 15, 2003.

Helpfile of Version 2.0 of MP3 Tag Clinic, 'Online!; Feb. 10, 2004; pp. 1-29 XP-002334789.

"Rename Page", "Illegal Character Editor", "Main Editor", "Options Panel", "URL Editor", "Metadata Attribute List/Cross Reference", from the Index of HelpFile of version 2.9 of MP3 Tag Clinic.

X.500 Object Identifiers allocated by OpenFortress 'Online!, Jun. 19, 2002 (2 pgs.) XP002334790.

Mp3/Tag Studio, The Mp3/Tag Studio Homepage, Jan. 24, 2001, http://web.archive.org/20010124052500/http://www.magnusbrading.com/mp3ts/.

MacNames, "MacNames: automation of Macintosh files renaming on a Windows NT/2000 Server", Dec. 16, 2002, http://web.archive.org/web/20021216053800/peccatte.karefil.com/software/MacNames/ManNamesEN.htm, 1-4.

IEEE, "IEEE 100: The Authoritative Dictionary of IEEE Standard Terms," Oct. 3, 2000, IEEE Press, Seventh Edition, 181-182, 210 and 379.

Blanton, "Microsoft Computer Dictionary," Jan. 22, 2002, Microsoft Press, Fifth Edition, 122 and 192.

"The Model Primary Content Type for Multipurpose Internet Mail Extensions", S. Nelson et al., Standards Track, RFC 2077, Jan. 1997, 13 pgs., http://www.ietf.org/rfc/rfc2077.txt?number=2077.

MIME (Multipurpose Internet Mail Extensions) Part One: Mechanisms for Specifying and Describing the Format of Internet Message Bodies, N. Borenstein et al., Innosoft, Sep. 1993, 76 pgs., http://web.archive.org/web/20010725010911/http://archive.ncsa.uiuc.edu/SDG/Software/M...

Various File Formats and How to Deal With Them, 12 pgs., http://www.stack.com/file/extension/ Jun. 5, 2003.

Various File Formats and How to Deal With Them, 12 pgs., http://web.archive.org/web/20030501192745/http://www. mtsu.edu/~webctsub/file_formats/various_file_formats_and_how_to.htm May 1, 2003.

Download Plug-Ins Using the Packeteer Support Website, 3 pgs., http://support.packeteer.com/documentation/packetguide/current/nav/tasks/configure/download-plugins-website.htm. Feb. 26, 2007.

Adobe Reader, 1 pg., http://www.adobe.com/products/acrobat/readstep2.html Feb. 23, 2007.

File Types, 1 pg., http://msdn.microsoft.com/library/default.asp?url=library/en-us/shellcc/platform/shell/pro... Feb. 23, 2007.

Computer High-Tech Dictionary Types, 9 pgs., http://www.computeruser.com/resources/dictionary/filetypes.html Feb. 23, 2007.

Office Action (Mail date Apr. 4, 2007) for U.S. Appl. No. 10/533,597, Filing Date May 2, 2005.

May 16, 2007 Response filed for Office Action (Mail date Apr. 4, 2007) for U.S. Appl. No. 10/533,597, Filing Date May 2, 2005.

Notice of Allowance (Mail Date Sep. 20, 2007) for U.S. Appl. No. 10/533,597, Filing Date May 2, 2005.

Office Action (Mail date Oct. 2, 2008) for U.S. Appl. No. 10/596,244, Filing Date Jun. 6, 2006.

Dec. 30, 2008 Response filed for Office Action (Mail date Oct. 2, 2008) for U.S. Appl. No. 10/596,244, Filing Date Jun. 6, 2006.

Final Office Action (Mail date Mar. 11, 2009) for U.S. Appl. No. 10/596,244, Filing Date Jun. 6, 2006.

May 8, 2009 Response filed for Final Office Action (Mail date Mar. 11, 2009) for U.S. Appl. No. 10/596,244, Filing Date Jun. 6, 2006.

Advisory Action (Mail Date May 26, 2009 for U.S. Appl. No. 10/596,244, Filing Date Jun. 6, 2006.

Jun. 11, 2009 filed Request for Continued Examination (RCE) and Amendment for U.S. Appl. No. 10/596,244, Filing Date Jun. 6, 2006.

Notice of Allowance (Mail Date Aug. 20, 2009) for U.S. Appl. No. 10/596,244, Filing Date Jun. 6, 2006.

Office Action (Mail Date Jun. 11, 2007) for U.S. Appl. No. 10/957,256, Filing Date Oct. 1, 2004.

Sep. 11, 2007 Response filed for Office Action (Mail Date Jun. 11, 2007) for U.S. Appl. No. 10/957,256, Filing Date Oct. 1, 2004.

Final Office Action (Mail Date Nov. 28, 2007) for U.S. Appl. No. 10/957,256, Filing Date Oct. 1, 2004.

Feb. 28, 2008 filed Request for Continued Examination (RCE) and Amendment for U.S. Appl. No. 10/957,256, Filing Date Oct. 1, 2004.

Notice of Allowance (Mail Date Mar. 24, 2008) for U.S. Appl. No. 10/957,256, Filing Date Oct. 1, 2004.

Office Action (Mail Date Feb. 1, 2011) for U.S. Appl. No. 12/059,216, Filing Date Mar. 31, 2008.
May 2, 2011 Response filed for Office Action (Mail Date Feb. 1, 2011) for U.S. Appl. No. 12/059,216, Filing Date Mar. 31, 2008.
Office Action (Mail Date Nov. 24, 2009) for U.S. Appl. No. 12/246,260, Filing Date Oct. 6, 2008.
Feb. 22, 2010 Response filed for Office Action (Mail Date Nov. 24, 2009) for U.S. Appl. No. 12/246,260, Filing Date Oct. 6, 2008.
Notice of Allowance (Mail Date Mar. 1, 2010) for U.S. Appl. No. 12/246,260, Filing Date Oct. 6, 2008.

* cited by examiner

METHOD AND SYSTEMS FOR HYPERLINKING FILES

This application is Continuation of Ser. No. 10/533,597, filed May 2, 2005, now U.S. Pat. No. 7,330,863 B2, issued Feb. 12, 2008.

FIELD OF THE INVENTION

The present invention relates to information storage and retrieval systems, and more particularly to a method and systems for creating hyperlinks from a file to source files, from which it has been copied, and/or any other target files (source files and/or other target files located on the same or different computer systems).

BACKGROUND OF THE INVENTION

Generally, computer systems store data such as computer programs, text documents, graphics, pictures, audio, video, or other information and documents as files that may contain any combination of these kind of information. These files are typically maintained on a hard disk drive associated with a computer but may also be maintained in memory, on floppy drives, remote servers, or other types of mass storage media. To simplify their retrieval, files are generally dispatched among numerous directories or folders. Each directory or folder may have sub-directories or sub-folders. A computer system may contain hundreds of such directories or folders, and file servers, which may be a part of a computer system, may have thousands of such directories or folders. A user generally locates a file by using the file's filename, typically a short character string, e.g. "myphoto.gif", a disk drive designation and directory or folder may be prepended to the filename, e.g. "C:\photos\myphoto.gif".

Different types of file systems are available for different operating systems. Each file system type has its own format and set of characteristics such as filename length, maximum file size and so on. For example, on Linux operating system, the most commonly used file system type is the Second Extended File system, also known as ext2fs. It allows filenames up to 256 characters. On Windows (registered trademark of Microsoft Corp.) the VFAT (Windows 95) and FAT32 (Windows 98) file system maximum length of filenames is 255 characters. NTFS and UNIX file system maximum length of filenames is 256 characters.

On the Internet, an addressing scheme is employed to identify resources e.g., HTTP servers, files or programs, and files or HTML documents to display. This addressing scheme is called Uniform Resource Locator (URL). An URL may contain the application protocol to use when accessing the server e.g., "http", the Internet domain name, also referred to as the server host name, of the site on which the server is running, the port number of the server (the port number may not be specified in the URL but is obtained by translating the server host name), and the location of the resource in the file structure of the server. For example, the URL

--- http://www.christusrex.org/www2/berry/f6v.html

--- specifies the application protocol "http", the server host name "www.christusrex.org", and the server file path to the accessed file "/www2/berry/f6v.html".

If the client request is for a file, the HTTP server locates the file and sends it to the client. Depending on the type of file retrieved, the client may activate an application to process the file. Upon reception of a file, the client browser typically examines the extension to determine how to process the file after receipt e.g., launching an application program to process the file. For example, if an HTML document is retrieved, a client's web browser may parse the HTML document and display it. Likewise, if a word processing document is retrieved, the client may activate a word processor to process the document. Alternatively, the accessed file may be saved locally (or downloaded) for a further use.

Most operating systems and file systems do not enable, once a file has been downloaded, to keep track of the relationship between a downloaded or copied file (children) and the source file (parent). For instance, when a file is copied from a network e.g., the Internet, from a server computer to a client computer, the relationship of the copy file on the client computer with the source file on the server computer is lost because the URL of the source file is not recorded with the copied file.

A serious risk associated to the exchange of electronic information on open and unsecured networks, particularly on the Internet, concerns the modification of data during the transfer. As a consequence, it is important to check files received over a network to verify that they have not been corrupted nor altered and/or that they have not been sent by an impostor. It may also be important to keep track of the source files when documents are modified so as to recover the original ones e.g., to analyze modifications.

A file may also have descriptive and referential information i.e., file metadata, associated with it. This information may be relative to the source, content, generation date and place, ownership or copyright notice, central storage location, conditions to use, related documentation, applications associated with the file or services. However, most file systems do not enable to keep a persistent connection of a file with the associated metadata. When a file is transmitted from a computer system to another the connection of that file with associated metadata is frequently lost.

When a user receives a file through a network e.g., by clicking on the icon of a file attached to a received e-mail, he would need to get, apart from the attached file, metadata related with such file. For example, when a file is received from an Internet server, it may be necessary to verify that it has not been corrupted, altered in some manner or to verify that it has been received from the proper sender rather than by an impostor. Particularly, if the received file is a software program, it could be of the utmost importance to ensure that received file has been sent by a trustworthy party prior exposing the computer system to a program file that might include a "Trojan Horse" or that could infect the user's computer with a virus. To that aim, the user may require to access file metadata, particularly a digital certificate and digital signature, to verify the authenticity and integrity of the file before executing it.

Today there are different approaches for implementing the association of a file with metadata of that file. Basically, metadata of a file can be encoded onto the same filename of the file, they can be prepended or appended onto the file as part of a file wrapper structure, they can be embedded at a well-defined convenient point elsewhere within the file, or they can be created as an entirely separate file. Each approach has inherent advantages and disadvantages:

naming a file so that the filename encodes metadata is possible in theory but, while an attempt may be made to make a filename descriptive, it is generally impossible to provide an adequate description of a file on a filename due to filename length restrictions.

wrapping a file with delimiters and prepending or appending metadata at the beginning or the end of the file is convenient (as both the file and the metadata travel together) and algorithms to extract the metadata encoded in this way are simple and efficient. Conversely, wrapper and metadata must generally have to be removed before the file can be used as originally intended. For this reason, metadata analysis typically only occurs when the file is retrieved. If the file is later passed on or moved, metadata would be lost. Another limitation of metadata wrapping methods is the incompatibility of those methods with standard types of files and file formats that prevents their use for encoding metadata on many types of files such as image, video, audio or executable files.

embedding metadata onto the digital representation of files is described in publication entitled "Techniques for data hiding" by W. Bender and al. IBM Systems Journal, Vol. 35, Nos 3&4, 1996. The most common form of high bit-rate encoding on images is the replacement of the least significant luminance bits of image with the embedded data. This technique is imperceptible (the alteration of the image is not noticeable) and may serve various purposes, including watermarking or tamper-proofing. Since metadata is embedded in the file, metadata extraction could be done during file retrieval, each time the file is rendered, or at any other arbitrary time post-receipt. The greatest limitations of such data embedding methods are a lack of current standardization about how (and where) to integrate metadata into the many different possible types of files and file formats, particularly on image, video, audio or executable files, and the added complexity of algorithms to extract metadata from files encoded in many different ways. Another drawback of this solution is that embedded metadata would affect the readability of documents or downgrade the quality of digital images.

maintaining metafiles separately e.g., on a server, from related files has the advantage of supporting metafile access, however the address of the metafile (being itself metadata of the file) must be known in advance or must be determined in some way from the file. A well known solution consists in relating the metafile filename to the filename of the associated file using some lexicographic rule e.g., using a different file extension. If some applications use filename conventions to associate files with metafiles produced by those applications, filenames for the associated files (or metafiles) may be cryptic, and may be significant only to the application. Another important drawback is that the association of the file with the metafile may be lost when the file is transmitted to a different system e.g., through a network.

As a conclusion, there is a need for a method and systems for creating hyperlinks from a main file to target files, that could be either source or other associated files.

SUMMARY OF THE INVENTION

Thus, it is a broad object of the invention to remedy the shortcomings of the prior art as described here above.

It is another object of the invention to provide a method and systems to create hyperlinks from a main file to target files so that each target file may be accessed from the main file.

It is a further object of the invention to provide a method and a system to create an hyperlink from a main file to the source from which it has been retrieved.

It is still a further object of the invention to provide a method and systems to create hyperlinks from a main file to associated metadata.

The accomplishment of these and other related objects is achieved by a computer-like readable medium comprising a main file having a filename including a primary filename and at least one encoded target file address, the primary filename of said main file and said at least one encoded target file address being separated by a first control character and two consecutive encoded target addresses being separated by a second control character, and by a method for hyperlinking at least one target file available at a target address to a main file having a primary filename, said method comprising the steps of:
    encoding the target address of each of said target files;
    merging said primary filename and said encoded target addresses in a filename; and,
    renaming said main file with said filename,
    wherein said primary filename and said encoded target addresses are separated by a first control character and two consecutive encoded target addresses are separated by a second control character.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 1 comprising

DETAILED DESCRIPTION OF THE PREFERRED EMBODIMENT

According to the invention, the filename of a main file is used to encode the target addresses of one or several target files, using a particular lexicography. The used lexicography is determined so as to avoid particular characters that may be forbidden by the file system, e.g., "\" with Microsoft Windows system, and/or to encode the target addresses so as to reduce their sizes. The target addresses to be encoded may be of any forms e.g., local addresses, addresses in private networks or Internet addresses, however, for sake of illustration, the examples given in the following description are based on URL type of addresses.

In a first embodiment, a method for encoding the source file address from which a file is saved, is disclosed. According to this embodiment, the source file address may be encoded either when the main file is transmitted from the server to the user system or when it is locally saved or transmitted to another system. Likewise, the source file address may represent either the address of the source file or the address of the Internet page wherein the main file is included.

Figure 1A:
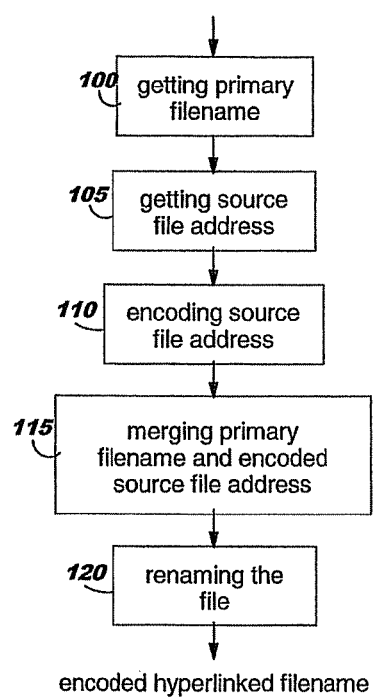
FIGS. 1a and 1b, illustrates an example of the algorithm used to encode the source address of a main file in the filename of this main file.

FIG. 1 illustrates an example of the algorithm used to encode the source file address. As shown on FIG. 1a, a first step consists in getting the primary filename of the main file, i.e. the filename of the file before encoding the source file address, (box 100) and the URL of the Internet page wherein the main file is included or the own address of the main file, referred to as the source file address (box 105). Then, the source file address is encoded (box 110) and merged with the primary filename of the main file, using particular separators (box 115) before the file is renamed with the filename comprising the primary filename and the encoded source file address (box 120).

Figure 1B:
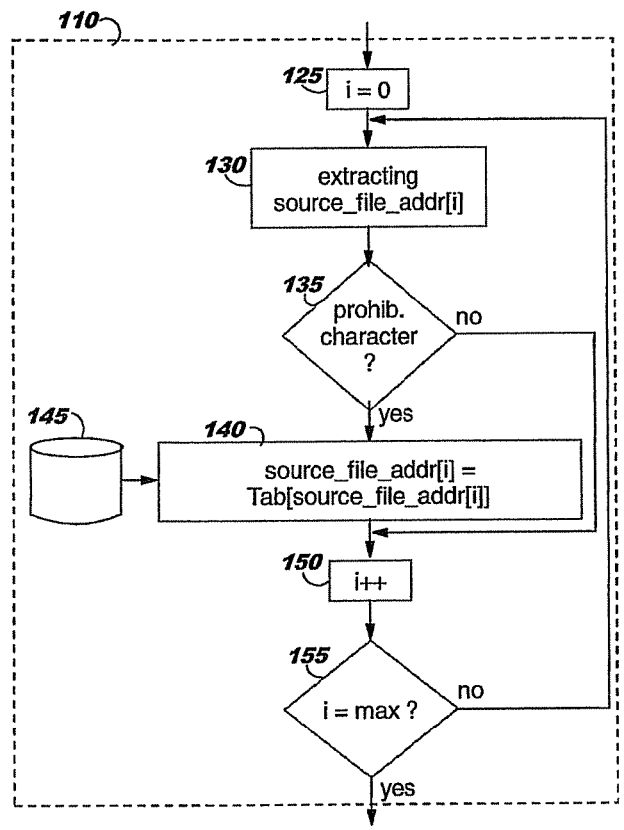

FIG. 1b depicts an example of an encoding algorithm (box 110). A variable i is set to zero (box 125) and the $i^{th}$ character is extracted from the source file address string (box 130). A test is performed to determine whether or not this extracted character is forbidden by the file system of the user (box 135). If this extracted character is not forbidden, variable i is incremented by one (box 150) and a new test is performed to determine if variable i has reached its maximum value that is equal to the length of the source file address (box 155). If variable i has not reached its maximum value, the last four steps are repeated (boxes 130 to 155). Else, if variable i has reached its maximum value, the process is stopped. If the extracted character is forbidden, a corresponding character is selected in lexicography table 145 and this selected character replaces the forbidden one (box 140). Then variable i is incremented by one and the test to determine if variable i has reached its maximum value is performed, as described above.

As an illustration, let us consider a main file consisting in an image, having "myphoto.jpg" as primary filename, that is included on an Internet page having the following URL, "http://www.my_server.com/ph_012.html"

and a lexicography table wherein

":" is associated to ".."
"/" is associated to "("

When the user chooses an option to download this image, such as the standard menus "save . . . ", "save as . . . " or "send to . . . ", this image is transmitted from the Internet server to the user system with the corresponding primary filename and the URL is encoded as follows by using the previous lexicography table:

"http..((www.my_server.com(ph_012.html)"

Then, the encoded URL is merged with the primary filename. In this example, the encoded URL is enclosed in parenthesis that are used as separators. The encoded URL is inserted in front of the extension dot of the primary filename as follows:

"myphoto(http..((www.my_server.com(ph_012.html).jpg"

and the main file is renamed using this "encoded hyperlinked filename".

Instead of associating the address of the Internet page wherein the image is included and from which it is copied, the encoded hyperlinked filename may contain the address of the source image file. For example, if the address of the image file is "http://www.my_server.com/my_ph.jpg"

then, the encoded source file address is

"http..((www.my_server.com(my_ph.jpg)"

and so, the "encoded hyperlinked filename" assigned to the stored image file is

"my_photo(http..((www.my_server.com(my_ph.jpg).jpg"

It must be noticed that, for sake of illustration, this encoding algorithm is purposely very simple. A preferred one would consist in replacing a sequence of forbidden characters by a single one e.g., replacing "//:" by "(". Likewise, some sets of characters may be replaced by more compact codes e.g., replacing "http://" by "H!". This kind of encoding optimisation will be discussed later.

Figure 2:
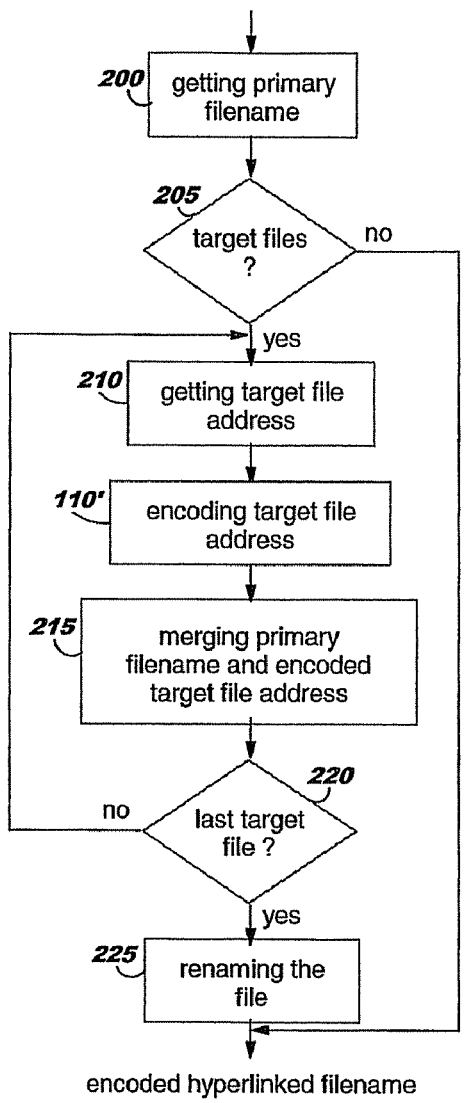
FIG. 2 shows an example of the algorithm for encoding a plurality of target file addresses in the filename of a main file.

In a second embodiment, the method for encoding the addresses of one or a plurality of associated target files is disclosed. As discussed above, a target file may consist for example, of a source file, metadata, computer programs, text documents, graphics, pictures, audio, video or other information. A target file may also provide services that may be accessed through e.g., an HTML file. In this embodiment, the method of the invention may be integrated as a module of most of software e.g., this module may be launched optionally when saving a main file, or implemented as an independent software. FIG. 2 shows the main steps of this embodiment. After getting the primary filename of the main file (box 200) a test is performed to determine whether or not the user needs to associate target files (box 205), if not the process ends. Else if the user needs to associate target files, a request is transmitted to the user to enter the address of the first target file to associate therewith (box 210). To that end, the user may type the target address or determine it using a standard browsing function. Then, the address of the target file to associate is encoded (box 110') and merged with the primary filename using particular separators (box 215). An algorithm similar to the one described by reference to FIG. 1b may be used to encode the address of the target file to associate. A second test is performed to determine whether or not the user desires to associate more target files (box 220). If there is no more target file to associate, the process ends. Else, the last four steps are repeated (boxes 210 to 220). A control character is inserted between each encoded target addresses so that the encoded hyperlinked filename may be parsed and each target address may be retrieved. It must be noticed that the address of the source file of a copied or saved main file could be linked like any associated target files.

As an illustration, let us take again the previous example wherein the user wants now to associate, apart from the address of the source of the image, the address of a target file containing a textual description of the image. Thus, in this new example, the source file address and the address of the image description file must both be associated to the primary filename of the image. In this example, the primary filename of the image is "my_photo.jpg", the URL of the source image file is the URL of the textual description file is "http://www.my_server.com/my_ph.jpg"

"http://www.my_server.com/my_ph.txt"

and the lexicography table is, as before,

":" is associated to ".."
"/" is associated to "("

When saving this main file, the user may choose an option such as "associate files . . . " and then select the target files he or she likes to associate. In such a case, the addresses of all target files to associate are encoded. Thus, in this example, the encoded target addresses are "http..((www.my_server.com(my_ph.jpg"
"http..((www.my_server.com(my_ph.txt"

that are merged with the primary filename as follows,

"my_photo(http..((www.my_server.com(my_ph.jpg{http..((www.my_server.com(my_ph.txt).jpg"

In this example, external parenthesis "(" and ")" are used as separators to identify the primary filename portion where hyperlinks have been encoded and a bracket "{" is inserted between each encoded target address.

Once again, the encoding procedure may be optimized so as to reduce the length of the encoded hyperlinked filename.

Figure 3:
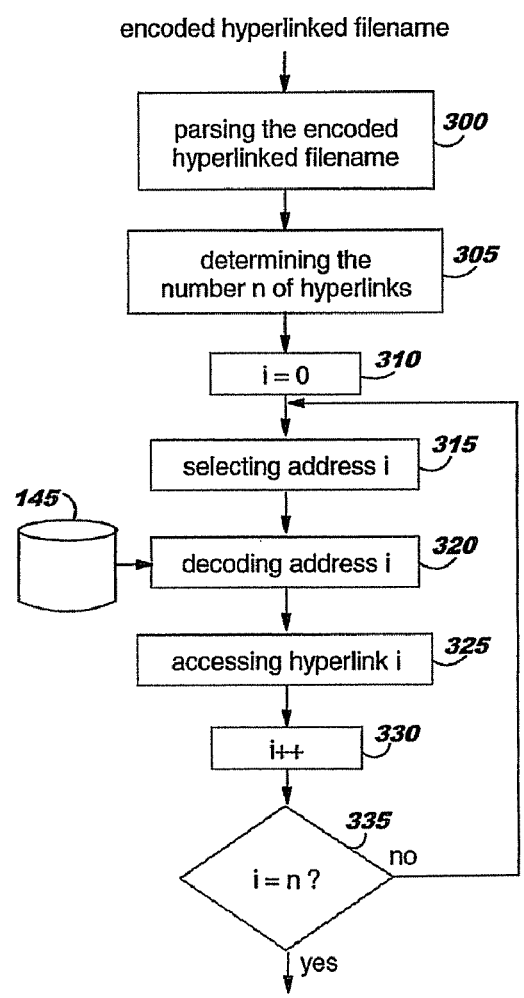
FIG. 3 describes an example of the algorithm used to decode an encoded hyperlinked filename.

A third embodiment concerns a method for decoding a filename comprising several encoded addresses of target files and then accessing these target files. FIG. 3 illustrates an example of an algorithm implementing such method. After having selected a main file which filename contains a primary filename and encoded target addresses, and upon selection of a button or menu like "view source file . . . " or "view associated files . . . ", the filename is parsed using the same separators than those used during the encoding process (box 300). Then, the number n of hyperlinks, i.e. the number of encoded target addresses, is determined (box 305) and a variable i is set to zero (box 310). The $i^{th}$ encoded target address is selected (box 315) and decoded using the lexicography table used for encoding this target address e.g., table 145, (box 320). Using this decoded target address, the associated target file may be accessed (box 325). As it is generally the case in Internet browser systems dealing with files, the accessed target file may be locally saved or a plug-in may be automatically launched to view the target file, depending upon selected options or software configuration. For example, if the accessed target file is an image, an image viewer or editor may be automatically launched. Preferably, the type of the target file is determined by analyzing the extension of the target address. Then variable i is incremented by one (box 330) and a test is performed to determine whether or not all hyperlinks have been accessed (box 335) i.e., if variable i has reached the number n of encoded target addresses, in which case the process ends. Otherwise, i.e., if variable i has not reached the number n of encoded hyperlinks, the last five steps are repeated (boxes 315 to 335). Optionally, the algorithm may include a sub-module allowing the user to select the hyperlinks for which associated target files have to be accessed so as to avoid accessing all of them. For sake of clarity, such option is not represented on the algorithm of FIG. 3.

This decoding algorithm may be illustrated with the previous example, wherein the encoded hyperlinked filename is:

"my_photo(http..((www.my_server.com(my_ph.jpg
{http..((www.my_server.com(my_ph.txt).jpg"

The encoded hyperlinked filename may be parsed, by identifying the separators "(", ")" and "{", to extract the primary filename of the main file and the encoded target addresses, respectively primary filename : my_photo.jpg
encoded target addr 1 : http..((www.my_server.com(my_ph.jpg
encoded target addr 2 : http..((www.my_server.com(my_ph.txt Then, using the lexicography table used for the encoding process, the encoded target addresses may be decoded as, target addr 1 : http://www.my_server.com/my_ph.jpg
target addr 2 : http://www.my_server.com/my_ph.txt and therefore, the associated target files may be accessed, i.e. viewed or locally saved. In this case, an image viewer and a text editor may be automatically launched when the target files are retrieved since extensions of target addresses are standard extensions that may be easily recognized ('jpg' and 'txt').

As discussed herein before, the address encoding procedure may be optimized to generate compressed encoded hyperlinked filenames. Even if different data compression techniques may be applied efficiently (with the only restriction of generating valid encoded filenames), only the simplest ones are described below (it is not the object of the invention to deal with data compression techniques).

Since target files hyperlinked to a main file are generally stored on the same location e.g., same folder, directory or web page, a single common path may be encoded so as to avoid redundancy. Thus, still considering the previous example wherein the encoded hyperlinked filename is "my_photo(http..((www.my_server.com(my_ph.jpg{http..((www.my_server.com(my_ph.txt).jpg"

the common path may be identified by a control character e.g., "}" at the end, thus preventing from the need of repeating the encoding of common paths. In such case, the new encoded hyperlinked filename is

```
"my_photo(http..((www.my_server.com( }my_ph.jpg{my_ph.
txt).jpg"
```

During the decoding process, once a common path has been identified as preceding common path control character "}", it is pre-pended to each of the following individual encoded target files paths, identified by means of the separator control character i.e., "{" in this example.

In the case where only a subset of target files share a common path, another control character may be inserted to identify path(s) that do not share the common path.

The encoded hyperlinked filename may also be optimized by replacing the host name by the Internet Protocol (IP) Domain Name Server (DNS) address. Determining the DNS address may be easily done by using standard API or operating system functions e.g. "ping" function under MS-DOS (registered trademark of Microsoft Corp.) operating system. In such case, the previous example of encoded hyperlinked filename is:

```
"my_photo(http..((9.164.194.241( }my_ph.jpg{my_ph.txt)
.jpg"
``` assuming that 9.164.194.241 is the IP address of the server having "my_server.com" as host name.

Finally, as discussed above, some frequently used sets of characters e.g., "http://", "http://www." or "ftp://", may be replaced by more compact codes e.g., "H!", "W!" or "F!", respectively. Such reserved strings of characters and the associated compact codes may be stored in the lexicography table mentioned above. Still considering the previous example, the optimized encoded hyperlinked filename is:

```
"my_photo(H!9.164.194.241( }my_ph.jpg{my_ph.txt).jpg"
```

However, it must be noticed that, in this particular case, the set of characters "http://" (i.e. HTTP internet access protocol code) may even be ignored since generally Internet browsers automatically assume HTTP access protocol by default.

Figure 4:
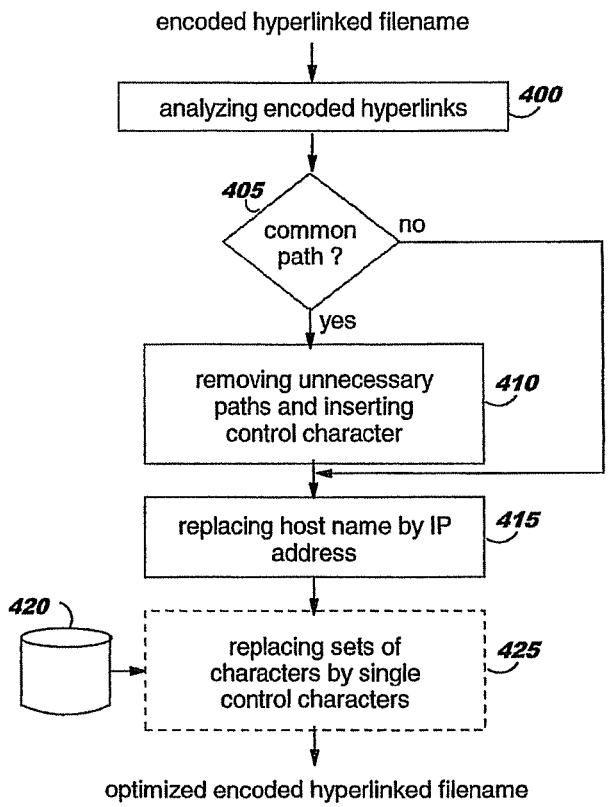
FIG. 4 illustrates an example of an algorithm used to optimize file address encoding.

FIG. 4 illustrates an example of an optimized encoding algorithm that may be used in conjunction with the one described by reference to FIG. 2 e.g., between steps corresponding to boxes 220 and 225. A first step consists in analyzing the encoded target addresses so as to determine whether or not the encoded target addresses share a common path (box 400). If there is a common path, a control character is inserted at the end of the first common path and following ones are removed from the encoded hyperlinked filename (box 410). If there is no common path, the previous step is ignored. Then, the host name is replaced by the DNS IP address (box 415). As mentioned above, the DNS IP address may be easily determined e.g., using an API function. Finally, the encoded hyperlinked filename is analyzed so as to replace sets of characters by associated compact codes according to lexicography table 420 which stores pairs of sets of characters and corresponding compact codes (box 425). As shown on the drawing with dotted line, this last step may be removed so as to be merged with the one consisting in encoding hyperlinks (box 110 of FIG. 1b). In such case, lexicography tables 145 and 420 are preferably merged.

Naturally, the steps of removing common paths, replacing host names by the DNS IP addresses and replacing sets of characters by control characters may be executed in any order without modifying the final result.

When the encoding process is optimized, the decoding process firstly consists in replacing the compact codes by corresponding sets of characters and inserting missing common paths before decoding the encoded hyperlinked filename as described by reference to FIG. 3. The lexicography table used for replacing compact codes by sets of characters must the same than the one applied for the optimization process. It is not required to replace IP addresses by host names however, it could be done using API or operating system functions e.g., "GetHostByName" function from DNSUtility Code.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for hyperlinking a main file with N target files, said main file and said N target files being stored in a computer readable storage medium of a computer system, said N at least 1, said method comprising:
   hyperlinking a primary filename of the main file with N target file addresses to form a composite filename, wherein the primary filename has a form of F.E, wherein the composite filename has a form of F(A).E, wherein F represents a name component of the primary filename, wherein E represents an extension component of the primary filename, wherein the N target files are denoted as $T_1, T_2, \ldots, T_N$ having the associated N target file addresses respectively denoted as $A_1, A_2, \ldots, A_N$, wherein A represents $A_1, A_2, \ldots, A_N$, wherein symbol (between said F and said A denotes a first control character that separates said F and said A, wherein symbol) between said A and said E denotes a second control character that separates said A and said E, wherein the second control character differs from the first control character, wherein the main file is a different file than each target file of the N target files, wherein the primary filename of the main file differs from the filename of each target file of the N target files, wherein the main file has an address that differs from each target file address of the N target file addresses and wherein a target file of the N target files consists of metadata, a computer program, a text document, graphics, a picture, audio, video, or a combination thereof; and
   storing the composite filename in said computer readable storage medium.

2. The method of claim 1, wherein the target file $T_i$ is a source file of the main file such that $A_i$ is a source file address of the source file $T_i$, and wherein i is selected from the group consisting of 1, 2, . . . , and N.

3. The method of claim 1, wherein N is at least 2, wherein A is represented in a form of $A_1\{A_2\{ \ldots \{A_N\}$, and wherein said symbol { denotes a third control character that separates $A_{n-1}$ and $A_n$ for n=2, . . . , N, and wherein the third control character differs from both the first control character and the second control character.

4. The method of claim 3, said method further comprising determining whether corresponding path portions of two consecutive target file addresses $A_i$ and $A_{i+1}$, is a common path, wherein i is selected from the group consisting of 1, 2, . . . , and N−1, and if said determining determines that said corresponding path portions is a common path then:

inserting a fourth control character denoted by a symbol } at the end of the common path of $A_i$, wherein the fourth control character differs from the first control character, the second control character, and the third control character; and removing the common path from $A_{i+1}$.

5. The method of claim 1, said method further comprising specifying predetermined character strings and associated substitute characters; and for n=1, 2, ..., N:

identifying in $A_n$ at least one character string of said predetermined character strings; and replacing in $A_n$ each identified character string with its associated substitute character.

6. The method of claim 1, said method further comprising:

decoding the composite filename, by parsing the composite filename, to extract from the composite filename a target file address $A_i$ of the N target file addresses, wherein i is selected from the group consisting of 1, 2, ..., and N; and accessing the target file $T_i$ at the target file address $A_i$.

7. The method of claim 6, said method further comprising:

analyzing the target file address $A_i$ to determine a file type of the target file $T_i$; and launching an application that is associated to the file type of the target file $T_i$.

8. An apparatus comprising: a computer system, said computer system comprising a computer readable storage medium, said computer readable storage medium comprising software configured to be executed by the computer system to implement a method for hyperlinking a main file with N target files, said main file and said N target files being stored in the computer system, said N at least 1, said method comprising:

hyperlinking a primary filename of the main file with N target file addresses to form a composite filename, wherein the primary filename has a form of F.E, wherein the composite filename has a form of F(A).E, wherein F represents a name component of the primary filename, wherein E represents an extension component of the primary filename, wherein the N target files are denoted as $T_1, T_2, \ldots, T_N$ having the associated N target file addresses respectively denoted as $A_1, A_2, \ldots, A_N$, wherein A represents $A_1, A_2, \ldots, A_N$, wherein symbol ( between said F and said A denotes a first control character that separates said F and said A, wherein symbol ) between said A and said E denotes a second control character that separates said A and said E, wherein the second control character differs from the first control character, wherein the main file is a different file than each target file of the N target files, wherein the primary filename of the main file differs from the filename of each target file of the N target files, wherein the main file has an address that differs from each target file address of the N target file addresses and wherein a target file of the N target files consists of metadata, a computer program, a text document, graphics, a picture, audio, video, or a combination thereof; and storing the composite filename in said computer readable storage medium.

9. The apparatus of claim 8, wherein the target file $T_i$ is a source file of the main file such that $A_i$ is a source file address of the source file $T_i$, and wherein i is selected from the group consisting of 1, 2, ..., and N.

10. The apparatus of claim 8, wherein N is at least 2, wherein A is represented in a form of $A_1\{A_2\{ \ldots \{A_N,$ and wherein said symbol { denotes a third control character that separates $A_{n-1}$ and $A_n$ for n=2, N, and wherein the third control character differs from both the first control character and the second control character.

11. The apparatus of claim 10, said method further comprising determining whether corresponding path portions of two consecutive target file addresses $A_i$ and $A_{i+1}$, is a common path, wherein i is selected from the group consisting of 1, 2, ..., and N−1, and if said determining determines that said corresponding path portions is a common path then:

inserting a fourth control character denoted by a symbol } at the end of the common path of $A_i$, wherein the fourth control character differs from the first control character, the second control character, and the third control character; and removing the common path from $A_{i+1}$.

12. The apparatus of claim 8, said method further comprising specifying predetermined character strings and associated substitute characters; and for n=1, 2, ..., N:

identifying in $A_n$ at least one character string of said predetermined character strings; and replacing in $A_n$ each identified character string with its associated substitute character.

13. The apparatus of claim 8, said method further comprising:

decoding the composite filename, by parsing the composite filename, to extract from the composite filename a target file address $A_i$ of the N target file addresses, wherein i is selected from the group consisting of 1, 2, ..., and N; and accessing the target file $T_i$ at the target file address $A_i$.

14. The apparatus of claim 13, said method further comprising:

analyzing the target file address $A_i$ to determine a file type of the target file $T_i$; and launching an application that is associated to the file type of the target file $T_i$.

15. A computer readable storage medium comprising software configured to be executed by a computer system to implement a method for hyperlinking a main file with N target files, said main file and said N target files being stored in the computer system, said N at least 1, said method comprising:

hyperlinking a primary filename of the main file with N target file addresses to form a composite filename, wherein the primary filename has a form of F.E, wherein the composite filename has a form of F(A).E, wherein F represents a name component of the primary filename, wherein E represents an extension component of the primary filename, wherein the N target files are denoted as $T_1, T_2, \ldots, T_N$ having the associated N target file addresses respectively denoted as $A_1, A_2, \ldots, A_N$, wherein A represents $A_1, A_2, \ldots, A_N$, wherein symbol (between said F and said A denotes a first control character that separates said F and said A, wherein symbol) between said A and said E denotes a second control character that separates said A and said E, wherein the second control character differs from the first control character, wherein the main file is a different file than each target file of the N target files, wherein the primary filename of the main file differs from the filename of each target file of the N target files, wherein the main file has an address that differs from each target file address of the N target file addresses and wherein a target file of the N target files consists of metadata, a computer program, a text document, graphics, a picture, audio, video, or a combination thereof; and storing the composite filename in said computer readable storage medium.

16. The computer readable storage medium of claim 15, wherein the target file $T_i$ is a source file of the main file such that $A_i$ is a source file address of the source file $T_i$, and wherein i is selected from the group consisting of 1, 2, . . . , and N.

17. The computer readable storage medium of claim 15, wherein N is at least 2, wherein A is represented in a form of $A_1\{A_2\{\ldots\{A_N\}$, and wherein said symbol { denotes a third control character that separates $A_{n-1}$ and $A_n$ for n=2, N, and wherein the third control character differs from both the first control character and the second control character.

18. The computer readable storage medium of claim 17, said method further comprising determining whether corresponding path portions of two consecutive target file addresses $A_i$ and $A_{i+1}$, is a common path, wherein i is selected from the group consisting of 1, 2, . . . , and N−1, and if said determining determines that said corresponding path portions is a common path then:
  inserting a fourth control character denoted by a symbol } at the end of the common path of $A_i$, wherein the fourth control character differs from the first control character, the second control character, and the third control character; and
  removing the common path from $A_{i+1}$.

19. The computer readable storage medium of claim 15, said method further comprising specifying predetermined character strings and associated substitute characters; and for n=1, 2, . . . , N:
  identifying in $A_n$ at least one character string of said predetermined character strings; and
  replacing in $A_n$ each identified character string with its associated substitute character.

20. The computer readable storage medium of claim 15, said method further comprising:
  decoding the composite filename, by parsing the composite filename, to extract from the composite filename a target file address $A_i$ of the N target file addresses, wherein i is selected from the group consisting of 1, 2, . . . , and N; and
  accessing the target file $T_i$ at the target file address $A_i$.

21. The computer readable storage medium of claim 20, said method further comprising:
  analyzing the target file address $A_i$ to determine a file type of the target file $T_i$; and
  launching an application that is associated to the file type of the target file $T_i$.

* * * * *